(No Model.) 2 Sheets—Sheet 2.
H. FRASCH.
MANUFACTURE OF SALT AND APPARATUS FOR USE THEREIN AND FOR OTHER PURPOSES.
No. 277,419. Patented May 8, 1883.
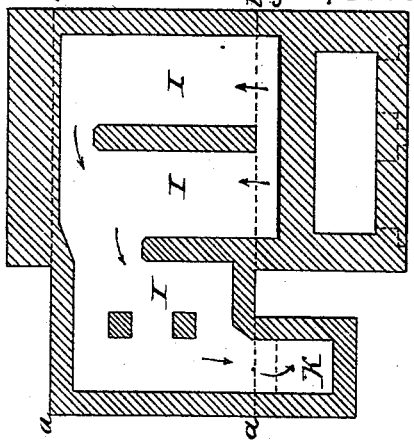
Fig. 5.
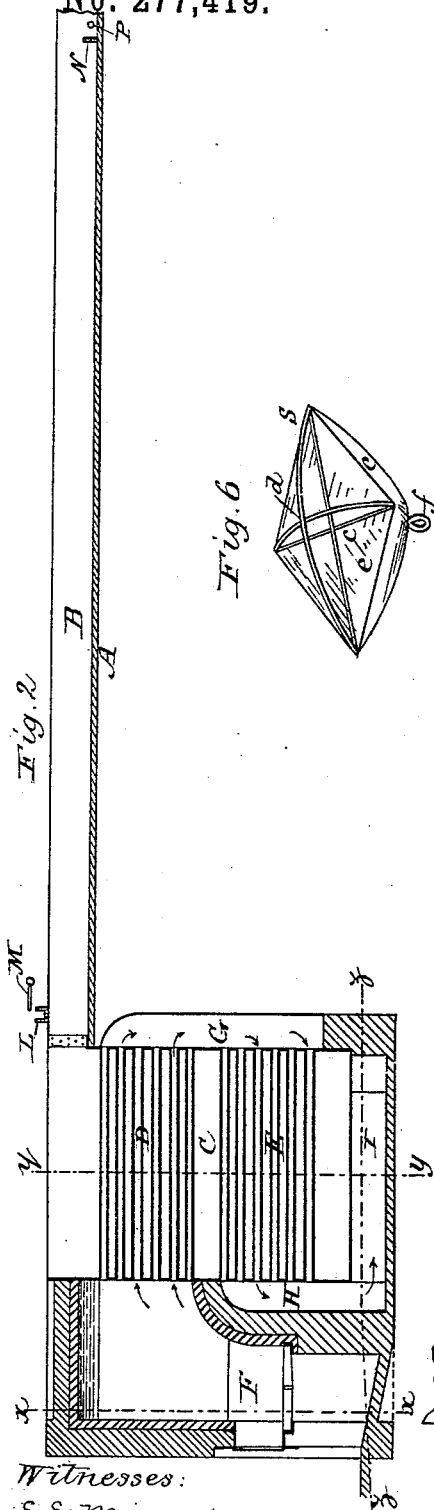
Fig. 2.
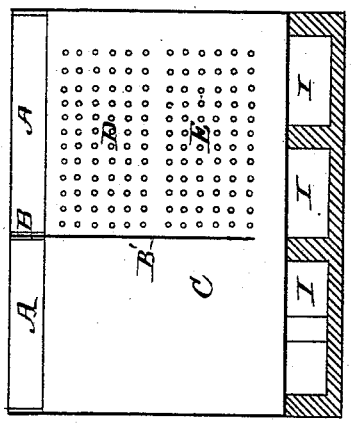
Fig. 6.
Fig. 4.
Fig. 3.
Witnesses:
E. E. Masson
W. B. Masson
Inventor
Herman Frasch
by Chas. J. Hedrick
his attorney
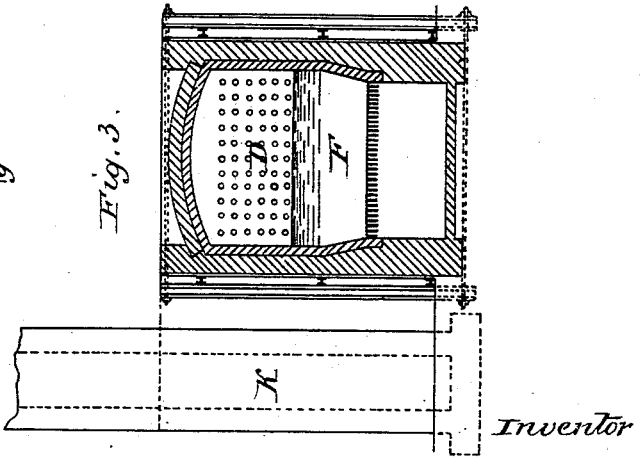

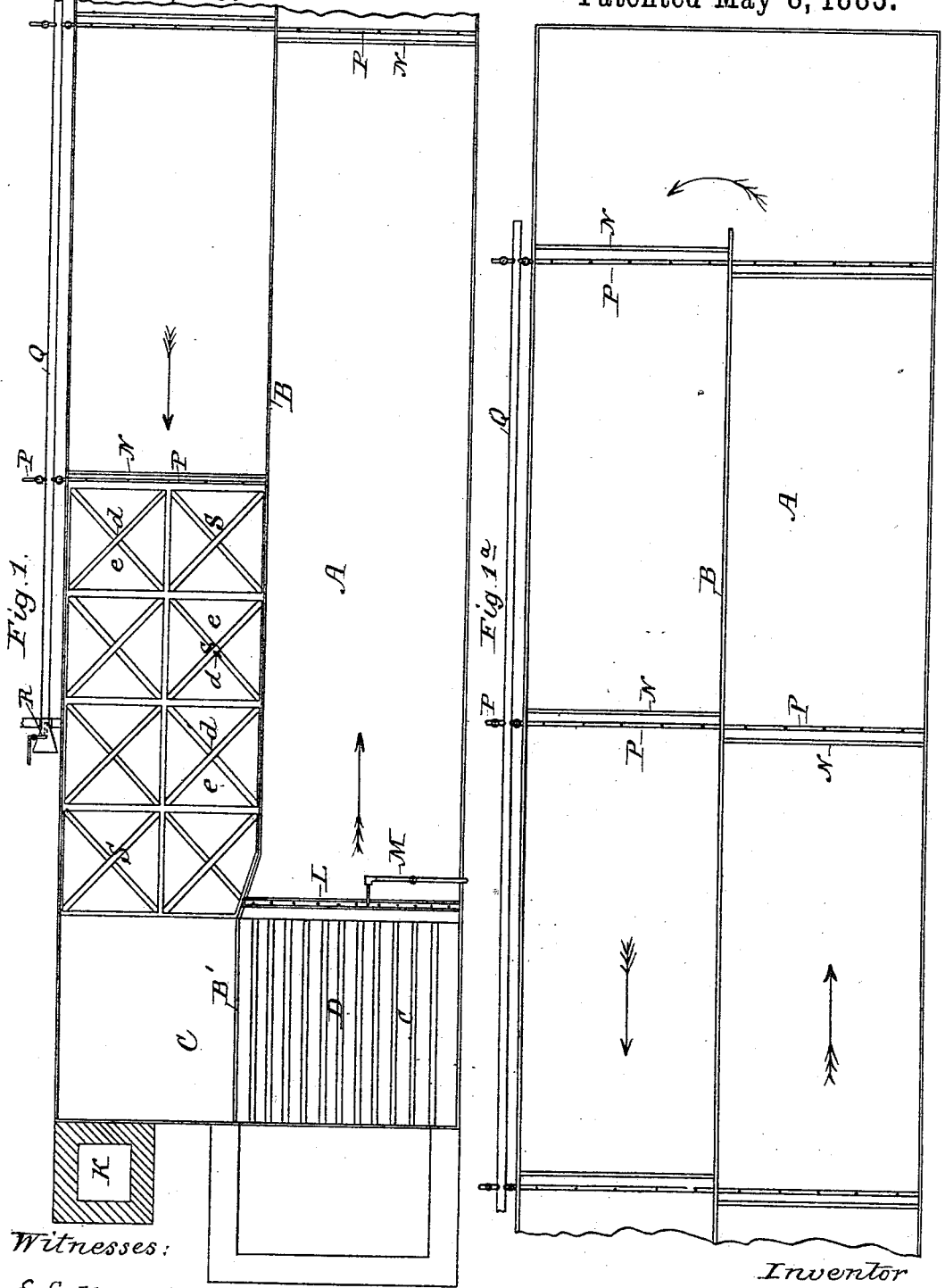

UNITED STATES PATENT OFFICE.

HERMAN FRASCH, OF CLEVELAND, OHIO, ASSIGNOR TO THE AMERICAN CHEMICAL COMPANY, OF WEST BAY CITY, MICHIGAN.

MANUFACTURE OF SALT AND APPARATUS FOR USE THEREIN AND FOR OTHER PURPOSES.

SPECIFICATION forming part of Letters Patent No. 277,419, dated May 8, 1883.

Application filed January 12, 1883. (No model.)

*To all whom it may concern:*

Be it known that I, HERMAN FRASCH, a citizen of the United States, residing at Cleveland, in the county of Cuyahoga and State of Ohio, have invented certain new and useful Improvements in the Manufacture of Salt and Apparatus for Use Therein and for other Purposes, of which the following specification is a full description.

This invention has reference to a method of and apparatus for evaporating salt-brine and other solutions and liquids; to a method of precipitating from the solution impurities, such as the gypsum in brine from natural wells; to a method of and apparatus for effecting the precipitation from solutions of salt and other materials, as fine particles or crystals in grainers or evaporators; to apparatus for recovering the precipitated materials, and to the combinations to the different apparatus aforesaid.

The present invention may be considered as an improvement upon, addition to, or modification of, that described in my application filed August 29, 1882, No. 70,569. The evaporator described in said application consists of a long trough and a box divided by a partition extending nearly to the bottom so as to form of the box an inverted siphon, the trough communicating at each end with the upper part of the box or siphon, so as to form a closed system, and the liquid to be evaporated is caused to flow continuously through said system by heating the liquid in one compartment or siphon-leg, so that on account of the difference in specific gravity the pressure in the two compartments or legs is unequal. The heater shown in said application consists of a single set or system of pipes, through which a hot fluid (products of combustion, steam, or other gas or a liquid) is passed.

The first part of the present invention consists in combining within an inverted siphon a heater with return flues, in arranging said flues so that the direct flues are above the return flues and heat the liquid after it has passed over them, and in arranging flues to heat the bottom of the box or siphon, and in combining the system of flues with a fire-chamber from which the products of combustion pass directly into the flues. The object of the return flues is to utilize the heat to the best advantage. Two or more sets of return flues may be used connected in series. The arrangement of the direct flues above the return flues is partly for the utilization of the heat by having the coolest liquid come into contact with the coolest pipes or flues, and partly to prevent incrustation on and burning of the direct flues by securing the heating of the brine before it passes over them. Salt will deposit from a saturated solution by mere friction over a surface. If therefore the solution while saturated be allowed to flow over the exterior of the flues, it may form an incrustation thereupon, and if these be the direct flues the high temperature in said flues is liable to burn the iron composing the same. By heating the brine, however, it is no longer in a state of saturation, (since salt is more soluble in hot than in cold water,) and therefore no incrustation will take place on the direct flues. If deposit takes place on the first return flues, there is less danger of burning the iron, owing to the comparatively low temperature in the flues. The salt deposited, also, not being subjected to a high temperature, will readily be dissolved should the solution fall below saturation. The heating of the bottom of the box or siphon is further to utilize the heat, to prevent deposition of salt on said bottom, and also to prevent incrustation on the flues. The solution, which is saturated in the descending leg of the siphon so soon as it becomes heated, is no longer so, and it may therefore take up any salt previously deposited on the bottom of the siphon, or being heated it is less liable to deposit upon the flues in the ascending leg. The use of the fire-chamber directly connected with the evaporator or grainer renders the apparatus complete in itself, and also enables a higher temperature to be maintained in the siphon. One or more of the above dispositions may be used without the others.

The second part of the invention consists in letting in a flow of fresh brine into the circulation during evaporation, so that this operation proceeds continuously with about the same quantity of liquid in the evaporator. To operate in this way, the salt-brine should not contain in large quantities impurities which would be deposited among the salt; but a pure or purified brine may be used, or, by means of the improvement next to be described, brine containing gypsum (calcium sulphate) or the like impurities may be used. Gypsum, being more soluble in cold water than in hot, is deposited on heating brine, which holds it in solution. By introducing the fresh brine into the current of brine as it comes hot from the siphon or box the former has its temperature raised, and the gypsum is at once thrown down. Very little of the gypsum remains in solution, not enough to incrust the pipes of the heater or to contaminate the salt. After the brine leaves the heater it does not begin to deposit salt until it has become cool and by evaporation lost part of the water, by which time it has flowed past the area in which the gypsum deposits, so that the salt is free from it.

The third part of the invention therefore consists in introducing the brine into the hottest part of the circulation as it leaves the siphon, box, or heater, so that the impurities—such as gypsum—which deposit on heating will be thrown down; and, further, in the combination, with evaporating-trough, siphon, and heater, of an inlet for introducing fresh liquid in the manner specified.

The fourth part of the invention consists in blowing air through the solution evaporating, in order to prevent the salt or other material forming a skin upon the liquid. It is found that when the salt is forming rapidly the salt crystals form so closely as to make a continuous skin of salt upon the surface of the brine. In my aforesaid application the solution is in the evaporating-trough thrown into eddies by placing obstructions in the current. These eddies throw down the salt; but when the temperature in the siphon is high they are or may be insufficient to prevent the formation of the skin referred to. The blowing in of the air prevents the formation. It may be resorted to where there are no obstructions, and even where there is no circulation; but it is used also in addition to the production of eddies by obstructions in the circulation, and, in fact, it is most advantageous so to use it, for the air-blast tends to retard the floating salt, and may where the circulation is not sufficiently rapid bank up the salt; but the obstructions by contracting the channel make the current so rapid as to carry the salt particles over the jets. The pierced pipes by which the air is admitted are preferably placed immediately behind the several obstructions, so that the liquid flowing through the evaporating-trough passes over an obstruction and then over a pierced pipe. So far as the principle of this portion of the invention is concerned, air or other suitable gas, cold or hot, may be forced into the solution evaporating; but in evaporating salt it is found that with air alone the holes in the pierced pipes are liable to become choked. By mixing steam with the air the difficulty is avoided. This is best accomplished by means of a steam-injector, which also serves to force the air into the liquid. The blowing in of the air aids in evaporating the liquid, and also in throwing down the fine salt, as well as serving to break up the skin, and may be used for these purposes even when there is no danger of forming a continuous skin. It should be understood, however, that the evaporation of liquid by blowing air through the same is not broadly covered by this invention.

The fifth part of the invention comprises a new construction of the receivers for collecting the solid material deposited in the evaporator or evaporting-trough. In my aforesaid application the receivers particularly described are simply canvas aprons, bound with rope and provided with loops for hanging up. In the present invention the fabric is stretched on a frame. The particular construction of this frame as well as the combination of it and the fabric are included in the invention.

The invention further comprises certain particular constructions, combinations, and arrangements of parts, as hereinafter specified.

The accompanying drawings, which form a part of this specification, represent apparatus constructed in accordance with the invention.

Figures 1 and 1ª are plan views; Fig. 2, a vertical longitudinal section; Fig. 3, a vertical cross-section on line $x\ x$, Fig. 2; Fig. 4, a similar view on line $y\ y$; Fig. 5, a horizontal section on line $z\ z$, and Fig. 6 a perspective view of one of the salt-receivers.

A is the evaporating-trough, divided by the partition B, which extends nearly to the farther end, so as to form an outgoing and a return conduit; and C, the box or tank, divided by the partition B', extending nearly to the bottom, so as to form an inverted or U-shaped siphon.

In one compartment of the box or leg of the siphon are placed the flues D E. The direct flues D occupy the upper part of the compartment or siphon-leg. They communicate with the fire-chamber F, from which they receive the hot gases or products of combustion, and they deliver the said gases into the connecting-flue G, whence they pass through the return flues E, which occupy the lower part of the compartment or siphon-leg. From the return flues E the gases pass by flue H into the flues I, beneath the tank C, or under the bottom of the siphon. The said flues I extend under both compartments or siphon-legs. Their arrangement is clearly shown in Fig. 5, wherein the dotted lines $a\ b$ indicate the position of the front and back walls of the tank above.

K is a chimney or uptake, into which the flues I deliver the gases or products of combustion. The brine in contact with the flues D E F G, being heated, becomes specifically lighter than the brine in the other compartment or siphon-leg, and therefore rises and flows through the evaporating-trough A in the direction of the arrows.

L is a small trough, with perforated bottom, supported above the outgoing conduit of the evaporating-trough A, near the tank or siphon C. Fresh brine runs from the pipe M into this trough L, and, escaping thence through perforations in the bottom, mingles with the current of brine in the evaporator or grainer, where it, (the said brine,) having just left the direct flues D, is hottest. The fresh brine being immediately raised in temperature, any gypsum or similar impurity held in solution is precipitated, and, being carried on by the current, settles on the bottom of the evaporating-trough.

At suitable distances apart, as well in the outgoing as in the return conduit, are placed obstructions N, shown as boards placed across the current, which throw the current into eddies and increase its velocity at those points. The first obstruction in the outgoing conduit is preferably placed at such a distance from the tank or siphon C that the precipitated gypsum will have a chance to settle before reaching it.

Behind each of the obstructions N, on the bottom of the evaporating-trough, is a perforated pipe, P, connected with a large distributing-pipe, Q, into which air is forced by the steam-injector R. The pipe Q is common to all the pipes P, so that the air forced into the pipe Q and mixed with the condensed steam from the injector R enters the perforated pipes P and passes in jets through the brine.

As shown in Figs. 1 and 1ª, there are two sets of pipes, P, on opposite sides of the pipe Q. The extra set is for supplying a second evaporator, placed alongside the one shown, with its cold side or return conduit of the evaporating-trough adjacent thereto. The pipes P, as also the steam-pipe for supplying the injector R and the pipe M, are provided with cocks and valves for controlling the flow of fluid therethrough. The trough A may be of any desired length. It is preferably about double the combined length of the portions shown in Figs. 1 and 1ª—say two hundred feet, with a width of eighteen feet.

The salt receivers or collectors S are each made of straight cross-pieces c, hooped cross-pieces d, and a canvas covering, e. The cross-pieces c d are joined together at their ends by a mortise and a metallic strip. The said ends are also connected by a rope, to which the canvas covering is sewed. On the bottom of the canvas covering is a loop, f. In Figs. 1 and 1ª the salt-receivers are shown only in a small part of the trough. They are to be placed all along it on the bottom of the trough.

The operation is as follows: The fire being started in the fire-chamber F, and the tank or siphon C and evaporating-trough being filled with brine, the hot gases or products of combustion passing through the flues D E G H I heat the brine in tank or siphon C, and cause it to flow round and round through the tank or siphon and the evaporating-trough. The cold or cool brine from the return conduit of the evaporating-trough, coming in contact with hotter and hotter surfaces—to wit, first the top of the flues I, then the exterior surfaces of flues E D and the side walls of flues H G—has its temperature gradually raised until finally it leaves the tank or siphon and enters the outgoing conduit of the evaporating-trough. This gradual rising of temperature utilizes the heat of the gases to the best advantage, and also avoids the precipitation of the salt upon the flues, in which the gases are very hot. As the brine enters the evaporating-trough it receives the fresh brine from the trough L and raises its temperature without substantial loss of its own, on account of the difference in volume. The rise of temperature throws down the gypsum in the fresh brine and it settles out of the liquid. The brine, as it flows through the evaporating-trough, loses its heat and its water until the liquid, being supersaturated, throws down salt. This begins to take place ordinarily after the gypsum has settled out. The precipitation of the salt is favored by the eddies which the obstructions N produce in the flowing brine. If very fine salt is to be made, the fire in the fire-chamber F is so regulated that the brine is highly heated in the ascending leg of the siphon—say to 205° Fahrenheit, or thereabout—at the exit, and steam is turned onto the injector R, so as to force air, or rather mingled air and steam, through the perforated pipes P. The jets of air break up the skin, which otherwise would form upon the liquid, and favor the precipitation. If a coarser grade of salt is to be made, the fire is not made so hot, and the air-blast is turned off or diminished or kept on at full head, as may be necessary or desirable. The brine may be given a temperature of from 170° to 190° Fahrenheit at its exit from the tank or siphon. Of course the brine could also be heated to other degrees, if desired. The salt precipitated settles out of the liquid and collects in the salt-receivers. These when full, or as full as may be desired, are hoisted out and allowed to drain, and then carried away by carriages running upon a track above the grainer or evaporator, as described in my before-mentioned application. They are raised by attaching the hoisting-rope to the hooped pieces d at their crossing. The cross-pieces c d, forming a frame, keep the canvas stretched, so that the contents of the receivers may more easily drain, and so that also the capacity of the receivers is increased. In order to dump the receivers, a hook is inserted in a loop, f, and the former support being withdrawn, the receiver is upheld thereby bottom upward, so that the contents at once falls out into the bin or other receptacle prepared to receive it. The gypsum which collects in the evaporating-trough is shoveled out from time to time. The evaporator or grainer is also emptied whenever the brine becomes charged with impurities.

Modifications may be made in the details without departing from the spirit of the invention, and portions of the invention may be used separately. Thus the inverted siphon may be formed otherwise than by a partitioned box or tank. The air-pipes could be applied to the apparatus shown in my former application or to those of other suitable construction. The improved receivers herein described could be used in said apparatus, or receivers of the form shown in said application. The evaporating apparatus could be used without any separate receivers, the salt being allowed to collect on the bottom of the trough. In like manner a large number of changes could be made, and yet the present invention be used in whole or in part.

I claim the new improvements herein described all and several, to wit:

1. In an evaporating apparatus, the combination, with an inverted siphon or the partitioned tank and an evaporating-trough, of a heater comprising direct and return flues in one leg of said siphon or compartment of the box, substantially as described.

2. The combination, with the siphon or tank and heating-flues in one leg or compartment thereof, of supplementary or auxiliary flues of lower temperature for heating the liquid before passing over the principal heating-flues, substantially as described.

3. The combination, with the siphon or tank and the evaporating-trough, of a heater having direct and return flues in one of the siphon's legs or of the tank's compartments, the return flues below the direct, substantially as described.

4. The combination, with the siphon or partitioned tank, of heating-flues at the bottom of siphon or tank, substantially as described.

5. The combination of the siphon or tank, a heater in one leg or compartment thereof, and heating-flues under the bottom, substantially as described.

6. The combination of the siphon or partitioned tank, the evaporating-trough, the heater comprising direct flues and return flues in one leg of the siphon or compartment of the tank, and the flues under the bottom of the siphon or tank, substantially as described.

7. In a grainer or evaporator, the combination of the evaporating-trough, the siphon or partitioned tank, the heating-flues, arranged as explained, and the fire-chamber forming part of the grainer or evaporator, and delivering the products of combustion into said flues, substantially as described.

8. In crystallizing salt or other material from solution in grainers or evaporators wherein a circulation is maintained, the improvement consisting in admitting fresh brine into the circulation to supply the liquid lost by evaporation, substantially as described.

9. In evaporating brine or other solution in evaporators or grainers wherein a circulation is maintained by heat, the improvement consisting in running fresh brine into the hot part of the circulation, so as to throw down the gypsum or other impurity precipitating by heat, substantially as described.

10. The combination, with the evaporating-trough, siphon, and heating means, of an inlet for admitting fresh liquid into the evaporator near the exit from the siphon, substantially as described.

11. The method of evaporating salt-brine and other solutions by heating and circulating the same in a suitable apparatus and blowing air or other gas through the flowing solution, substantially as described.

12. The method of making fine salt by heating the brine in the grainer or evaporator to a high degree and breaking up the skin which tends to form upon the liquid, substantially as described.

13. In evaporating salt-brine and similar solutions by artificial heat, the method of preventing the formation of a skin upon the solution by blowing of air or gas through the same, substantially as described.

14. The improvement consisting in mixing steam with the air blown into the solution, substantially as and for the purpose described.

15. The improvement consisting in forcing air into the solution by a steam-injector, so that the mixing of the air with and the pressure to force the mixture into the solution are at once obtained, substantially as described.

16. The improvement consisting in creating a circulation of the liquid to be evaporated, producing eddies in said circulation, and blowing air or air and steam into the liquid, substantially as described.

17. The combination, with an evaporator-trough and means for creating a circulation therein, of means, as explained, for introducing air, air and steam, or other gas into the liquid, substantially as described.

18. The combination, with an evaporating-trough, inverted siphon, and heater, of the perforated pipes and air-forcing means, substantially as described.

19. The combination of the evaporating-trough and the obstructions therein and the means for forcing air or other gas into the solution, substantially as described.

20. The combination, with an evaporator for saline or other solutions, of pierced pipes and a steam-injector for forcing a mixture of air and steam through said pipes into the solution, substantially as described.

21. The combination of the evaporating-trough, heater, obstructions in the trough, pipes for introducing air, and injector, substantially as described.

22. The combination, with the evaporating-trough and the obstructions therein, of the pierced pipes arranged behind said obstructions, substantially as described.

23. The collectors or salt-receivers comprising a fabric stretched upon a frame of wood or other suitable material, in combination with an evaporating apparatus or grainer, substantially as described.

24. The collectors or salt-receivers having a loop on the bottom for dumping, substantially as described.

25. The collectors or salt-receivers comprising the diagonal straight cross-piece and the diagonal hooked pieces, in combination with the canvas covering, substantially as described.

26. The combination, with the siphon of the fire-chamber, direct flues, return flues, and bottom flues, substantially as described.

27. The combination of the siphon, the trough, the heating-flues, the fire-chamber forming part of the evaporating apparatus and delivering the products of combustion directly into said flues, the obstructions in said trough, and the means for introducing air into the liquid in said trough, substantially as described.

28. The combination of the siphon, trough, heating-flues, fire-chamber, obstructions in trough, pierced pipes, and collectors or salt-receivers, substantially as described.

In testimony whereof I have affixed my signature in presence of two witnesses.

HERMAN FRASCH.

Witnesses:
PHILIP MAURO,
C. J. HEDRICK.